United States Patent [19]

Clark

[11] 4,394,761
[45] Jul. 19, 1983

[54] CURRENT SWITCHING TECHNIQUE

[75] Inventor: John L. Clark, Columbia Heights, Minn.

[73] Assignee: Honeywell Inc., Minneapolis, Minn.

[21] Appl. No.: 254,820

[22] Filed: Apr. 16, 1981

[51] Int. Cl.³ .............................................. H02H 7/20
[52] U.S. Cl. ...................................... 371/8; 307/219; 307/441
[58] Field of Search ..................... 371/8; 364/509, 570, 364/571, 187; 73/290 R, 304 C; 340/618, 620; 307/219, 441

[56] References Cited

U.S. PATENT DOCUMENTS

| | | | |
|---|---|---|---|
| 3,803,425 | 4/1974 | Carp | 307/219 |
| 3,875,390 | 4/1975 | Eccles et al. | 364/187 |
| 4,154,395 | 5/1979 | Fancy | 371/8 |
| 4,199,799 | 4/1980 | Ostenso et al. | 307/441 |
| 4,337,638 | 7/1982 | Leonard et al. | 73/304 C |
| 4,352,159 | 9/1982 | Colby | 364/509 |

Primary Examiner—Charles E. Atkinson
Attorney, Agent, or Firm—George W. Field

[57] ABSTRACT

A redundancy circuit comprising, in combination: a first measuring impedance; a plurality of operational amplifiers having inverting input terminals, non-inverting input terminals, and output terminals; a source of excitation voltage with respect to ground, the source being connected to the measuring impedance thus supplying signal current to the inverting input terminals, and the non-inverting input terminals being grounded; a like plurality of further impedances having first terminals connected respectively to the inverting terminals of the amplifier; and a switching arrangement having a plurality of conditions in each of which a selected one of the further impedances is connected between the output terminal and the inverting input terminal of a selected one of the amplifiers, and the remaining further impedances are connected between the inverting input terminals of the remaining amplifiers and ground.

6 Claims, 1 Drawing Figure

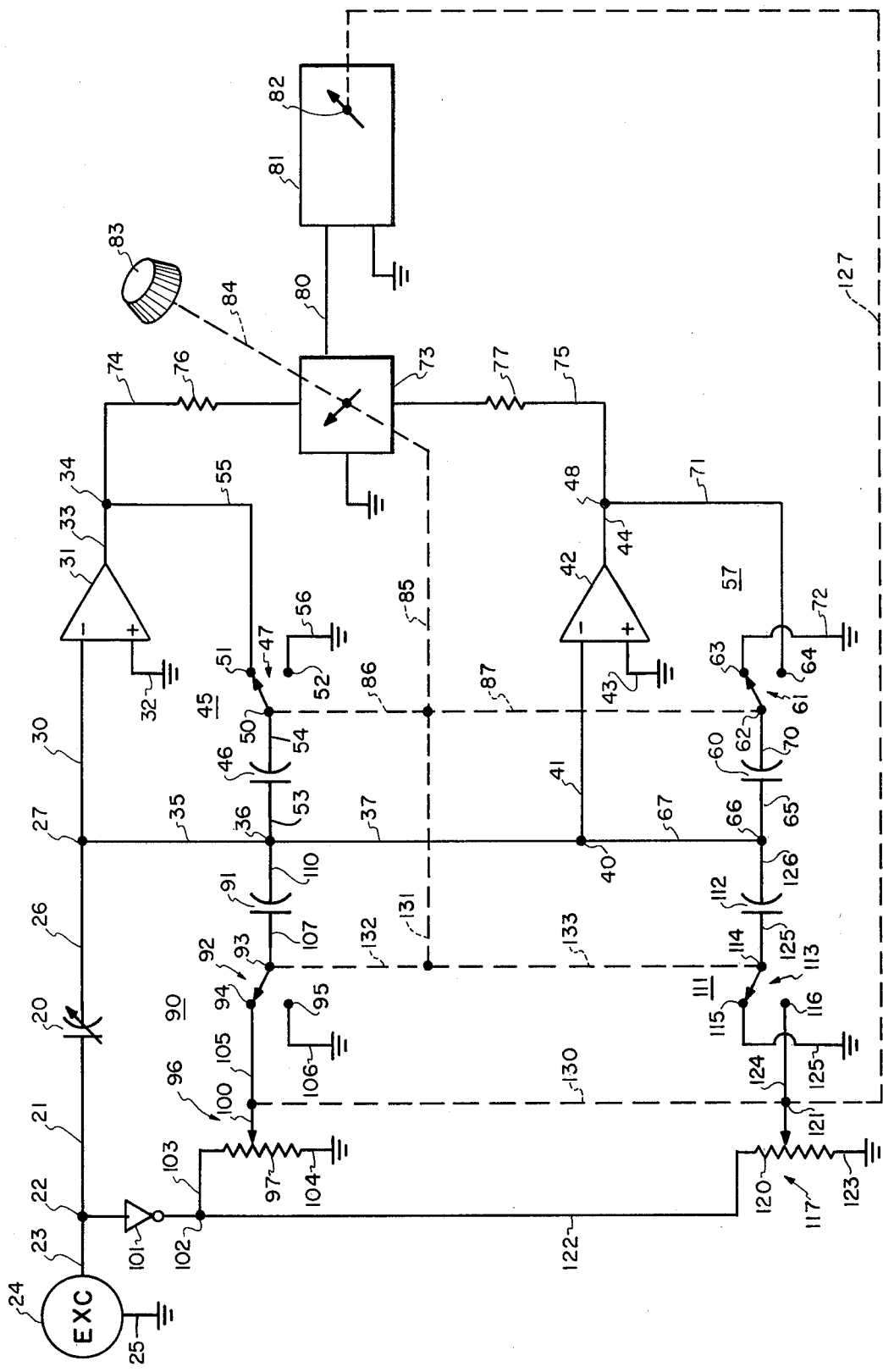

CURRENT SWITCHING TECHNIQUE

TECHNICAL FIELD

This invention relates to electrical engineering, and particularly to an arrangement by which desired electronic components of an electrical system may be given redundancy while not requiring redundancy of other parts of the system.

BACKGROUND OF THE INVENTION

There are electrical systems made up of plural components, some of which are inherently unlikely to fail, or impractical of replication, while others are of nature more susceptible of failure or of replication. Redundancy is an engineering principal by means of which the likelihood of system failure is reduced by replication of parts so that if any components fail, a duplicate may be substituted automatically or with slight delay.

For an example of a system where partial redundancy is desirable, consider the apparatus used to indicate the quantity or depth of fuel in the tanks of a large aircraft. The sensors or depth probes in the fuel tanks are physical structures not apt to any kind of failure, and the indicating devices observed by the pilot are likewise sturdy mechanical structures from which continued satisfactory performance may be expected. However, other components in such a system, which may be quite complex for a large aircraft and may include amplifiers, power supplies, multiplexers, microprocessors, and so on, are electronic in nature and statistical failure within a given period of time can be predicted with some certainty.

Difficulty has been experienced in the past, however, in providing electronic components which would not debase each other's accuracy when used concurrently, yet would be able to replace one another in case of failure. An example of this is operational amplifiers, which when connected in parallel to a current signal source divide the signal between themselves, so that neither gives an output correctly representative of the signal.

SUMMARY OF THE INVENTION

The present invention comprises circuitry by means of which two electronic components can be permanently connected physically to a single device in such a fashion that one of the components can be used as an accurate, independent device, yet upon failure of that one component the other can be quickly, safely and, if necessary, automatically substituted for the first one, to give redundancy of that portion of the system without requiring redundancy of other system components.

Various advantage and features of novelty which characterize the invention are pointed out with particularity in the claims annexed hereto and forming a part hereof. However, for a better understanding of the invention, its advantages, and objects attained by its use, reference should be had to the drawing which forms a part hereof, and to the accompanying descriptive matter, in which there is illustrated and described a preferred embodiment of the invention.

BRIEF DESCRIPTION OF THE DRAWING

The single FIGURE of the drawing shows the invention embodied in a practical indicating circuit.

DESCRIPTION OF THE PREFERRED EMBODIMENT

In the drawing a measuring impedance 20 is shown as a capacitor of which the capacitance varies with a condition being measured, as for example the depth of liquid fuel in a tank. A first terminal of capacitor 20 is connected through conductor 21, a junction point 22, and conductor 23 to a excitation signal generator 24, which supplies a constant voltage between conductor 23 and a ground connection 25. The second terminal of capacitor 20 is connected, through conductor 26, a junction point 27, and conductor 30, to the inverting input terminal of a first operational amplifier 31 having a non-inverting input terminal grounded at 32 and supplying an output on a conductor 33 to a junction point 34. The second terminal of capacitor 20 is also connected, through conductor 26, junction point 27, conductor 35, a junction point 36, conductor 37, a junction point 40, and conductor 41 to the inverting input terminal of a second operational amplifier 42 having a non-inverting input terminal grounded at 43 and supplying an output on a conductor 44 to a junction point 48. It is intended that amplifiers 31 and 42 be mutually redundant.

A first feedback circuit 45 is associated with amplifier 31, and includes a capacitive feedback impedance 46 and a single pole double throw switch 47 having a movable contact 50 and first and second fixed contacts 51 and 52. Capacitor 46 is connected by conductors 53 and 54 to junction point 36 and movable contact 50. Fixed contact 51 is connected to junction point 34 by conductor 55. Fixed contact 52 is grounded at 56.

A second feedback circuit 57 is associated with amplifier 42, and includes a capacitive feedback impedance 60 and a single pole double throw switch 61 having a movable contact 62 and first and second fixed contacts 63 and 64. Capacitor 60 is connected through conductor 65, a junction point 66, and conductor 67 to junction point 40, and by conductor 70 to movable contact 62. Fixed contact 64 is connected to junction point 48 by conductor 71. Fixed contact 63 is grounded at 72.

Junction points 34 and 48 are connected to a selector 73 by conductors 74 and 75, which may include coupling impedances 76 and 77 if desired. The selector supplies one of the amplifier outputs on a conductor 80 to a utilization device 81 shown as operating an indicating needle 82. By way of illustration, a manual knob 83 is shown as operating selector 73 and switches 47 and 61 through mechanical connections 84, 85, 86, and 87.

A first rebalance circuit 90 is associated with amplifier 31, and includes a capacitive rebalance impedance 91, a single pole double throw switch 92 having a movable contact 93 and first and second fixed contacts 94 and 95, and a voltage divider 96 having a winding 97 and a movable contact 100. Winding 97 is energized from source 24 through conductor 23, junction point 22, an inverter 101, a junction point 102, and conductor 103, and through ground connections 25 and 104. Movable contact 100 is connected to first fixed switch contact 94 by conductor 105, second fixed switch contact 95 is grounded at 106, and capacitor 91 is connected between movable switch contact 93 and junction point 36 by conductors 107 and 110.

A second rebalance circuit 111 is associated with amplifier 42, and includes a capacitive rebalance impedance 112, a single pole double throw switch 113 having a movable contact 114 and first and second fixed contacts 115 and 116, and a voltage divider 117 having a winding 120 and a movable contact 121. Winding 120 is energized from source 24 through conductor 23, junction point 22, inverter 101, junction point 102, and conductor 122, and through ground connections 25 and 123. Movable contact 121 is connected to second fixed switch contact 116 by conductor 124, first fixed switch contact 115 is grounded at 125, and capacitor 112 is connected between movable switch contact 114 and junction point 66 by conductors 125 and 126.

Movable contacts 100 and 121 are actuated through mechanical connections 127 and 130 by utilization device 81 concurrently with needle 82. Movable switch contacts 93 and 114 are actuated simultaneously with those of switches 47 and and 61 by mechanical connections 131, 132, and 133. It will be appreciated that, if desired, selector 73 may include or be operated by a sensing and relay arrangement which goes into operation if conditions warrant it, as indicated below.

The circuit can be implemented quite easily with solid state components in place of the mechanical components. In such a system, utilization device 81 would be replaced by a comparator circuit connected to a microprocessor controlled successive approximation type Analog-to-Digital (A/D) converter which would be used to simultaneously acquire the binary code representing fuel depth and adjust the feedback voltage at 100 and 121. This adjustment would be accomplished by replacing voltage dividers 96 and 117 with Digital-to-Analog (D/A) converters. Then the mechanical feedback links 127 and 130 would be replaced with control lines from the output port of the microprocessor controller to select a bit pattern appropriate to supply the voltages at 100 and 124 to bring the amplifier 31 or 42 output to a null, i.e. zero volts. In like manner, the switches 47, 61, 92, 73 and 113 can be any of the solid-state type electronic analog switches and are controlled by logic circuitry connected to the microprocessor controller output ports, instead of mechanical linkages 84, 85, 86, 87, 131, 132 and 133.

OPERATION

Consider first the operation of the invention without rebalance circuits 90 and 111. The capacitance of capacitor 20 is at some value determined by the depth of fuel being measured, and excitation generator 24 supplies, through capacitor 20 a current determined by its capacitive reactance. Amplifiers 31 and 42 are current devices, and if simply connected in parallel would attempt to divide the current from capacitor 20, so that neither amplifier would give an output representative of the fuel depth. However, feedback capacitor 60 is grounded at 72 and capacitor 112 is grounded at 125. As is well known, a feedback current is supplied through capacitor 46 which is equal in magnitude and opposite in phase to that from capacitor 20, so that junction points 27, 36, 40 and 66 which define an input bus, are all maintained at ground potential. No voltage appears across capacitors 60 and 112 therefore no current flows through either capacitor and since the input impedance of amplifier 42 is large, essentially no signal current is drawn by it. The output voltage at junction point 34 is thus representative of the fuel depth which is proportional to capacitor 20's current, and is supplied through selector 73 to device 81.

Turning now to the rebalance circuits 90 and 111, movable contact 121 is disconnected at switch 113, but movable contact 100 is connected to junction point 36 through capacitor 91, and a current is supplied through capacitor 91 of the same phase as that supplied through capacitor 46. The output of amplifier 31 may now become zero, the current through feedback capacitor 46 decreasing as that from rebalance capacitor 91 increases, while maintaining the amplifier input at zero volts, until the current through capacitor 91 is exactly equal and opposite to that from capacitor 20, when needle 82 indicates the depth of fuel in the tank, and the amplifier input and output are both at zero volts.

Now suppose that selector 73 and switches 47, 61, 92, and 113 are reversed. The output of amplifier 31 is cut off from device 81 and that from amplifier 42 is substituted. The feedback circuit for amplifier 42 is now complete through capacitor 60, and amplifier 42 now operates instead of amplifier 31 to maintain the input bus at ground potential by supplying a feedback current, equal and opposite to that from capacitor 20 until it is replaced by current from rebalance voltage divider 117 through capacitor 112. Capacitors 91 and 46 are grounded, and comprise no load on capacitor 20 since the voltage across these capacitors is zero. The output of amplifier 42 may now become zero, and needle 82 again indicates the depth of fuel this time using amplifier 42 rather than amplifier 31.

It is clear that in this combination of amplifiers each is redundant to the other. If desired, components 73 or 81 may include a watch dog circuit continuously monitoring one of the amplifier outputs, and automatically actuating the switches and selector, if the monitored output fails to automatically substitute the other amplifier and perhaps perform an appropriate indicating function that shows failure has occurred, as is well known in redundancy arrangments.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim:

1. A redundancy circuit comprising, in combination:
a measuring impedance;
first and second operational amplifiers having inverting input terminals, non-inverting input terminals, and output terminals;
a source of excitation voltage with respect to ground;
means connecting said source through said measuring impedance producing a signal current into said inverting input terminals to provide a signal to said amplifiers;
means grounding said non-inverting input terminals;
first and second feedback impedances;
and switch means having a first condition in which said first feedback impedance is connected between the output terminal and the inverting input terminal of said first amplifier, and said second feedback impedance is connected between said inverting terminal of said second amplifier and ground, so that the output of said first operational amplifier is representative of the signal current from said measuring impedance,
said switch means having a second condition in which said second feedback impedance is connected between the output terminal and the inverting input terminal of said second amplifier, and said first feedback impedance is connected between said inverting terminal of said first amplifier and ground, so that the output of said second operational amplifier is representative of the signal from said measuring impedance.

2. A circuit according to claim 1 including first and second further impedances and a second source of alternating voltage with respect to ground;

said switch means being further operative in said first condition to connect said first further impedance between said inverting input terminal of said first amplifier and said second source, and to connect said second further impedance between said inverting input terminal of said second amplifier and ground, and said switch means being further operative in said second condition to connect said second further impedance between said inverting input terminal of said second amplifier and said second source, and to connect said first further impedance between said inverting input of said first amplifier and ground.

3. A redundancy circuit comprising, in combination:
a measuring impedance;
a plurality of operational amplifiers having inverting input terminals, non-inverting input terminals, and output terminals;
a source of excitation voltage with respect to ground;
means connecting said source through said measuring impedance producing a signal current into said inverting input terminals;
means grounding said non-inverting input terminals;
a like plurality of further impedances having first terminals connected respectively to said inverting terminals of said amplifiers;
and switch means having a plurality of conditions in each of which a selected one of said further impedances is connected between the output terminal and the inverting input terminal of a selected one of said amplifiers, and the remaining further impedances are connected between the inverting input terminals of the remaining amplifiers and ground.

4. In a redundancy circuit, in combination;
an input bus;
means continuously supplying said bus with a signal current through a measuring impedance;
a plurality of operational amplifiers having output terminals and inverting and non-inverting input terminals;
means continuously connecting the inverting terminals of said amplifiers to said bus and grounding the non-inverting input terminals;
a like plurality of switch means each having a movable contact and a like plurality of fixed contacts engagable thereby in a predetermined sequence;
a plurality of feedback impedances;
means continuously connecting each of said feedback impedances between said bus and one of said movable contacts;
means severally connecting said output terminals to different ones of the fixed contacts of said switch means in the same succession; and
means grounding the remaining fixed contacts of all said switch means.

5. A circuit according to claim 4 and means for simultaneously actuating said movable contacts of said switch means through said predetermined sequence.

6. A circuit according to claim 5 and means actuated with said switching means for connecting said output terminals in succession to a utilization device.

* * * * *